(12) United States Patent
Gross

(10) Patent No.: US 6,203,181 B1
(45) Date of Patent: Mar. 20, 2001

(54) ILLUMINATED CAR LOCATOR

(75) Inventor: Leon S. Gross, Philadelphia, PA (US)

(73) Assignee: Enterprises, Inc., Philadelphia, PA (US)

( * ) Notice: Subject to any disclaimer, the term of this patent is extended or adjusted under 35 U.S.C. 154(b) by 0 days.

(21) Appl. No.: 09/027,969

(22) Filed: Feb. 23, 1998

Related U.S. Application Data

(63) Continuation-in-part of application No. 08/360,267, filed on Dec. 21, 1994, now Pat. No. 5,921,199, which is a continuation-in-part of application No. 08/303,457, filed on Sep. 9, 1994, now Pat. No. 5,609,121.

(51) Int. Cl.[7] .................................................. B60Q 1/00
(52) U.S. Cl. ..................... 362/486; 362/496; 362/503; 362/545
(58) Field of Search ........................ 362/544, 545, 362/240, 800, 496, 249, 503, 486; 340/468, 471, 472, 473

(56) References Cited

U.S. PATENT DOCUMENTS

| | | |
|---|---|---|
| D. 165,495 | 12/1951 | Thibault . |
| D. 173,202 | 10/1954 | Hollins . |
| D. 322,413 | 12/1991 | Castillo . |
| D. 326,432 | 5/1992 | McNulty . |
| D. 330,730 | 11/1992 | Watanabe . |
| D. 358,110 | 5/1995 | Gross ................................. D10/110 |
| 1,708,459 | 4/1929 | Wood . |
| 3,868,671 | 2/1975 | Maguire et al. . |
| 4,591,954 * | 5/1986 | Kawamura et al. .................. 362/545 |
| 5,038,255 * | 8/1991 | Nishihashi et al. .................. 362/544 |
| 5,103,205 | 4/1992 | Halligan ............................... 340/473 |
| 5,103,382 | 4/1992 | Kondo et al. ........................ 362/80.1 |
| 5,203,621 | 4/1993 | Weinmeister et al. ................. 362/66 |
| 5,418,697 * | 5/1995 | Chiou ................................. 362/545 |
| 5,558,424 | 9/1996 | Zeligson ................................. 362/66 |
| 5,569,681 | 10/1996 | Duarte . |
| 5,582,478 | 12/1996 | Ambrosino . |
| 5,595,441 | 1/1997 | McGee ................................. 362/250 |
| 5,609,121 | 3/1997 | Gross ................................. 116/28 R |
| 5,644,291 | 7/1997 | Jozwik . |

* cited by examiner

Primary Examiner—Thomas M. Sember
(74) Attorney, Agent, or Firm—Dann, Dorfman, Herrell and Skillman, P.C.

(57) ABSTRACT

A car locator comprising a base for attaching the locator to a car. A cantilevered support bar is pivotally connected with the base to permit pivotal movement and positioning of the bar relative to the base. The support bar is illuminated by a series of LEDS mounted on the support bar and connected to a power source and an optional switch via electrical conductors. The power source may include batteries mounted to or contained within the base. In addition, the switch may be mounted directly on the base.

3 Claims, 7 Drawing Sheets

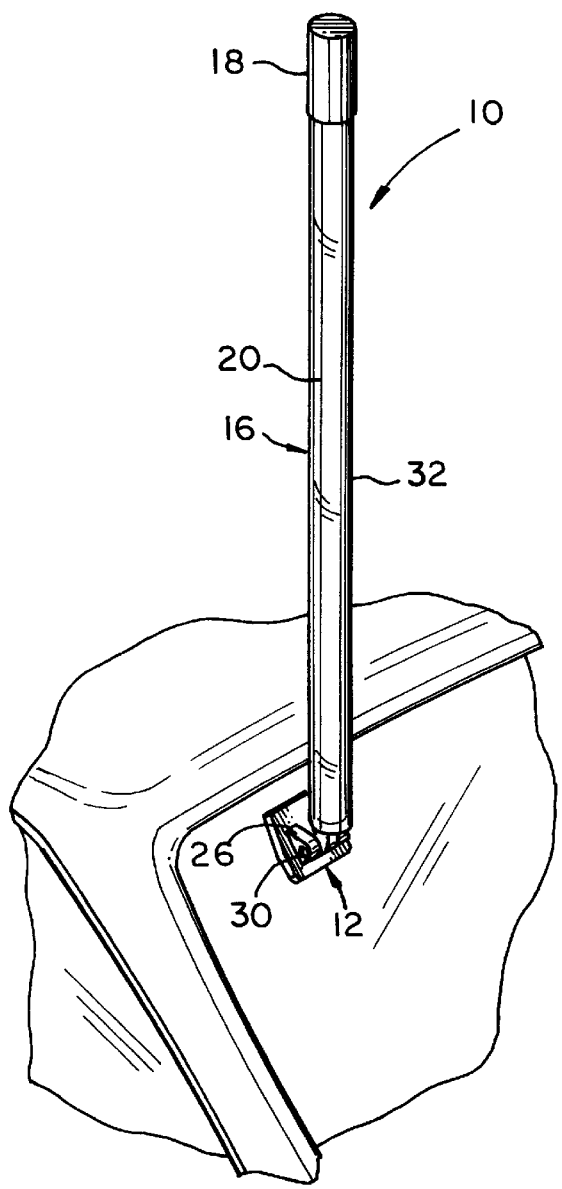
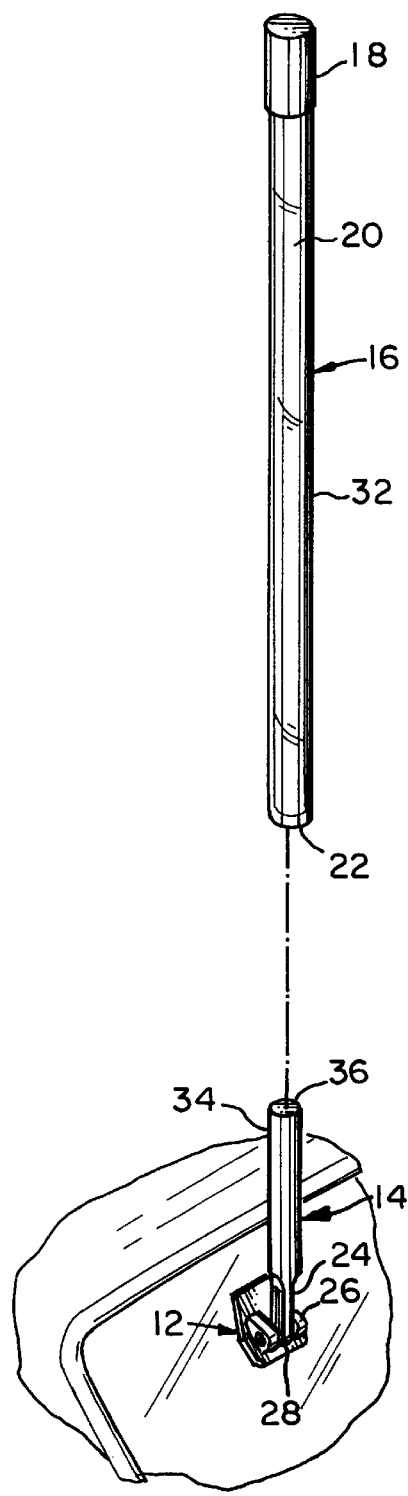

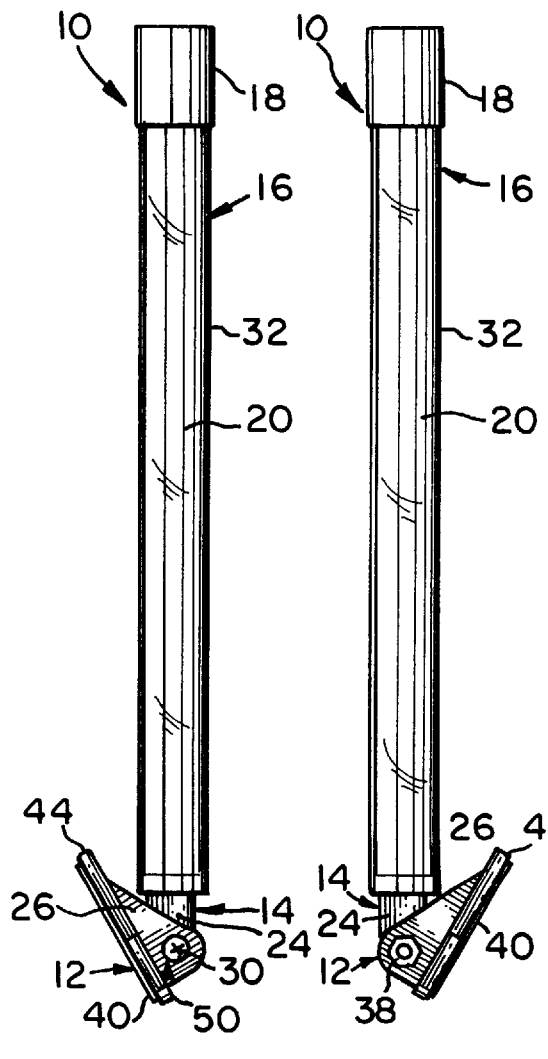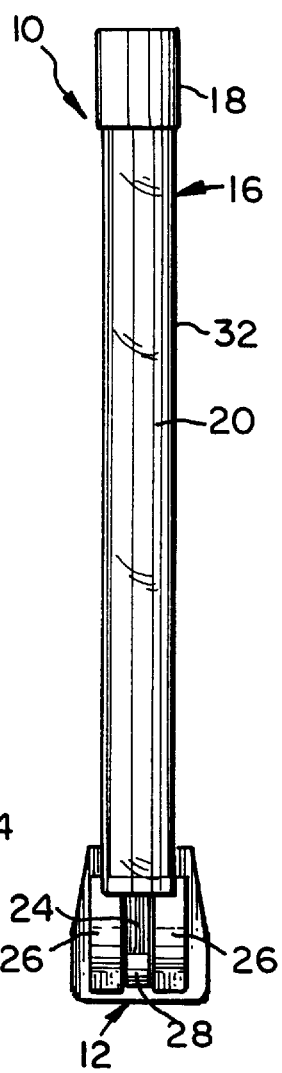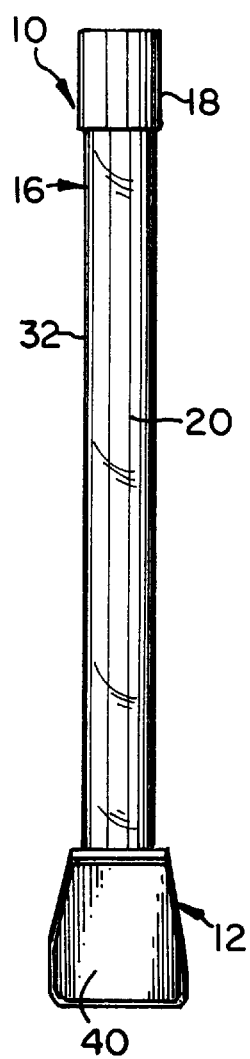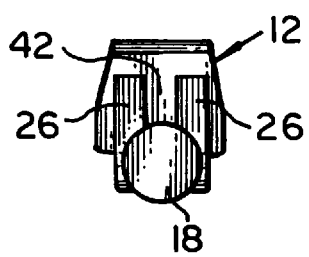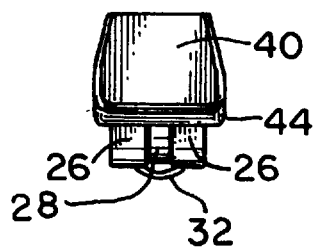

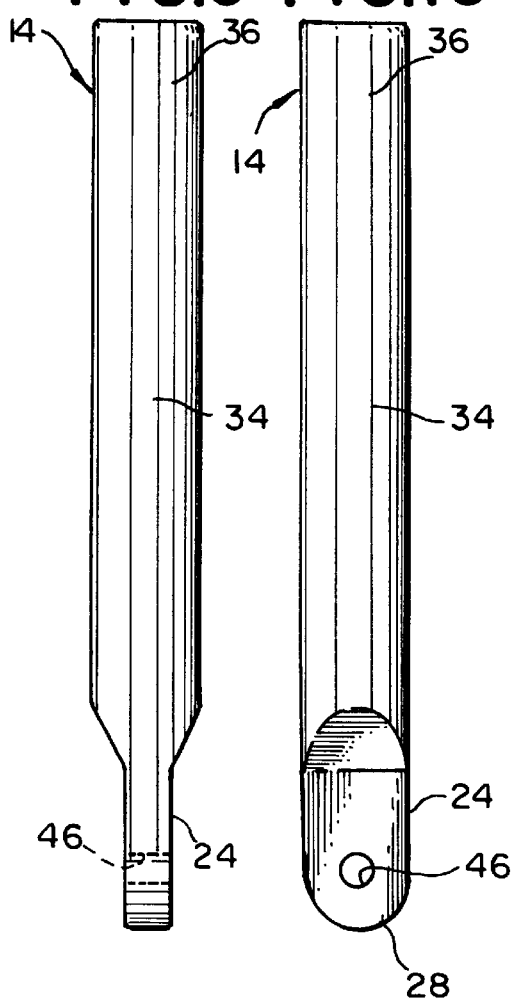
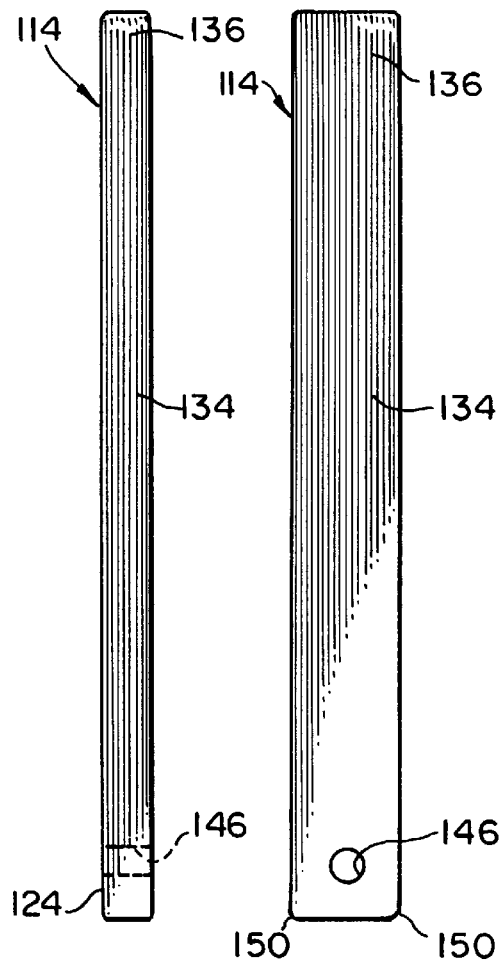
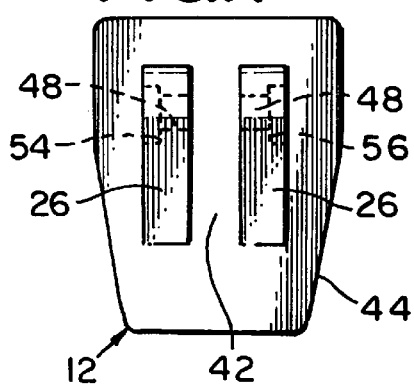
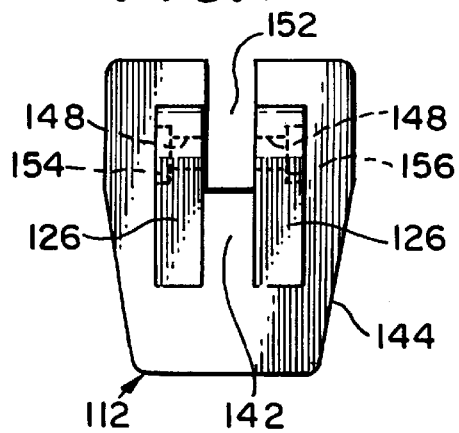

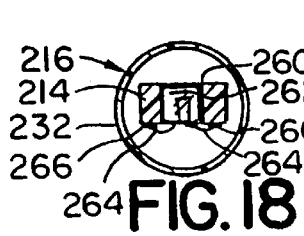
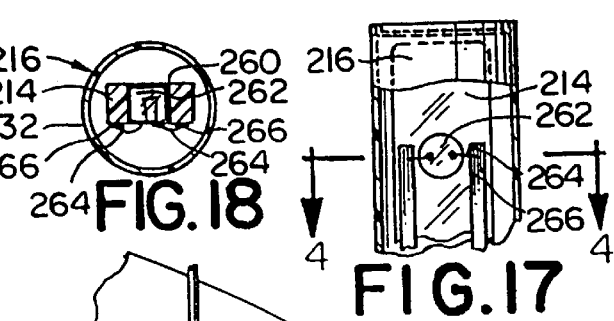
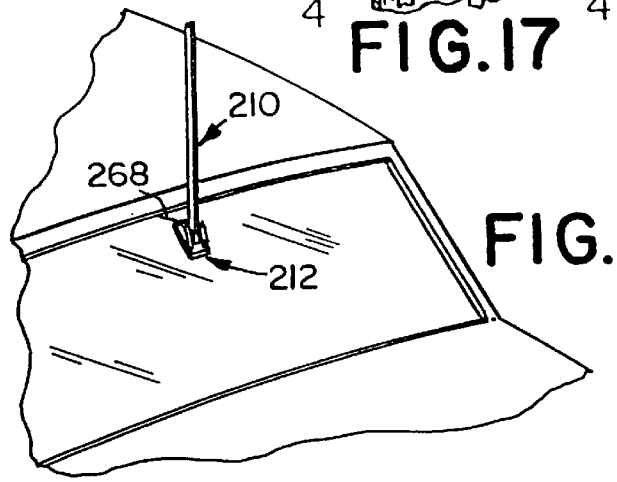
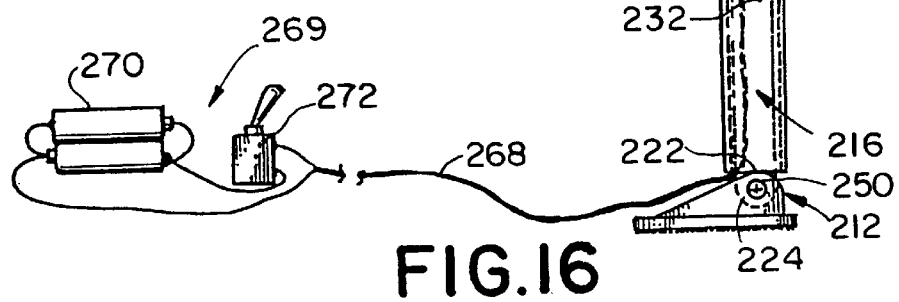
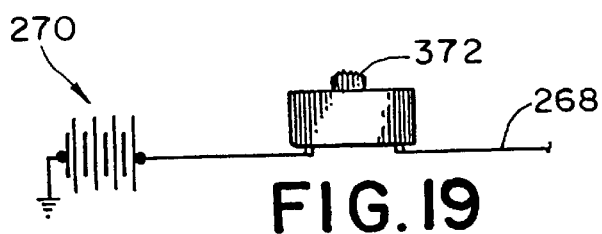
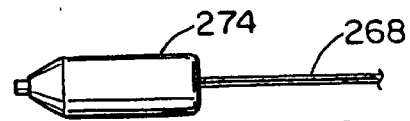
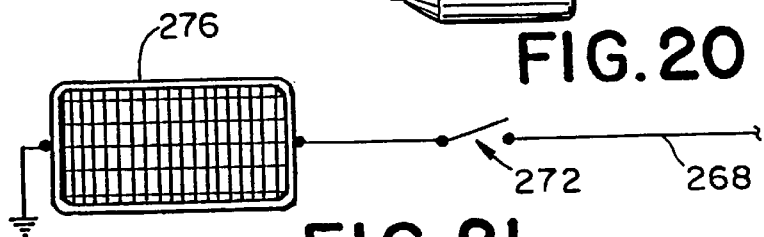

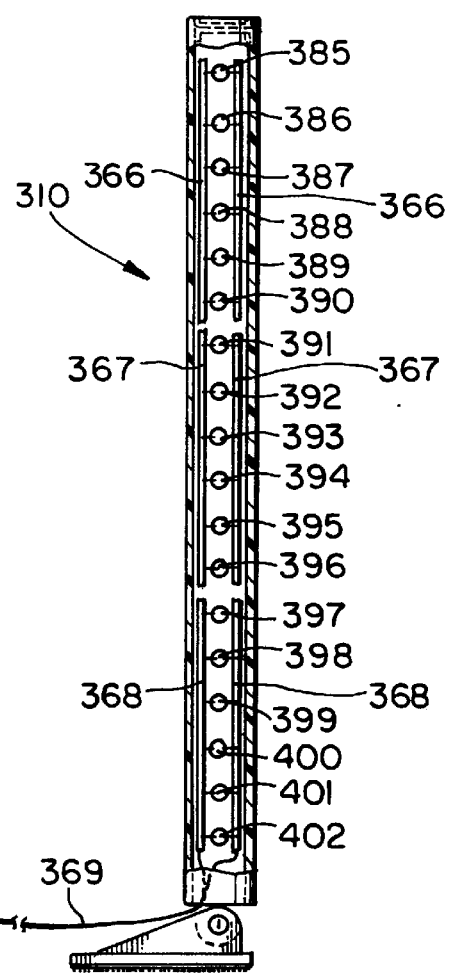
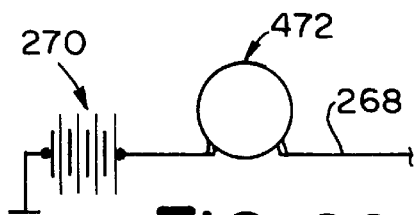
FIG. 22
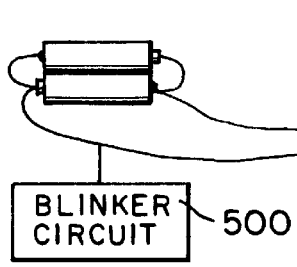
FIG. 23
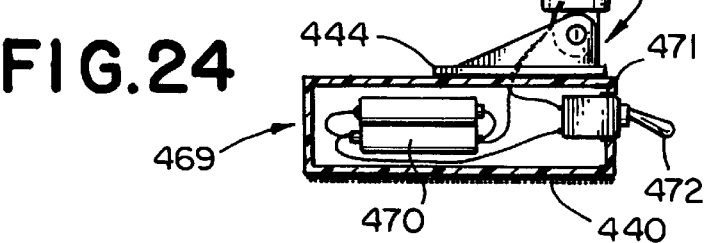
FIG. 24

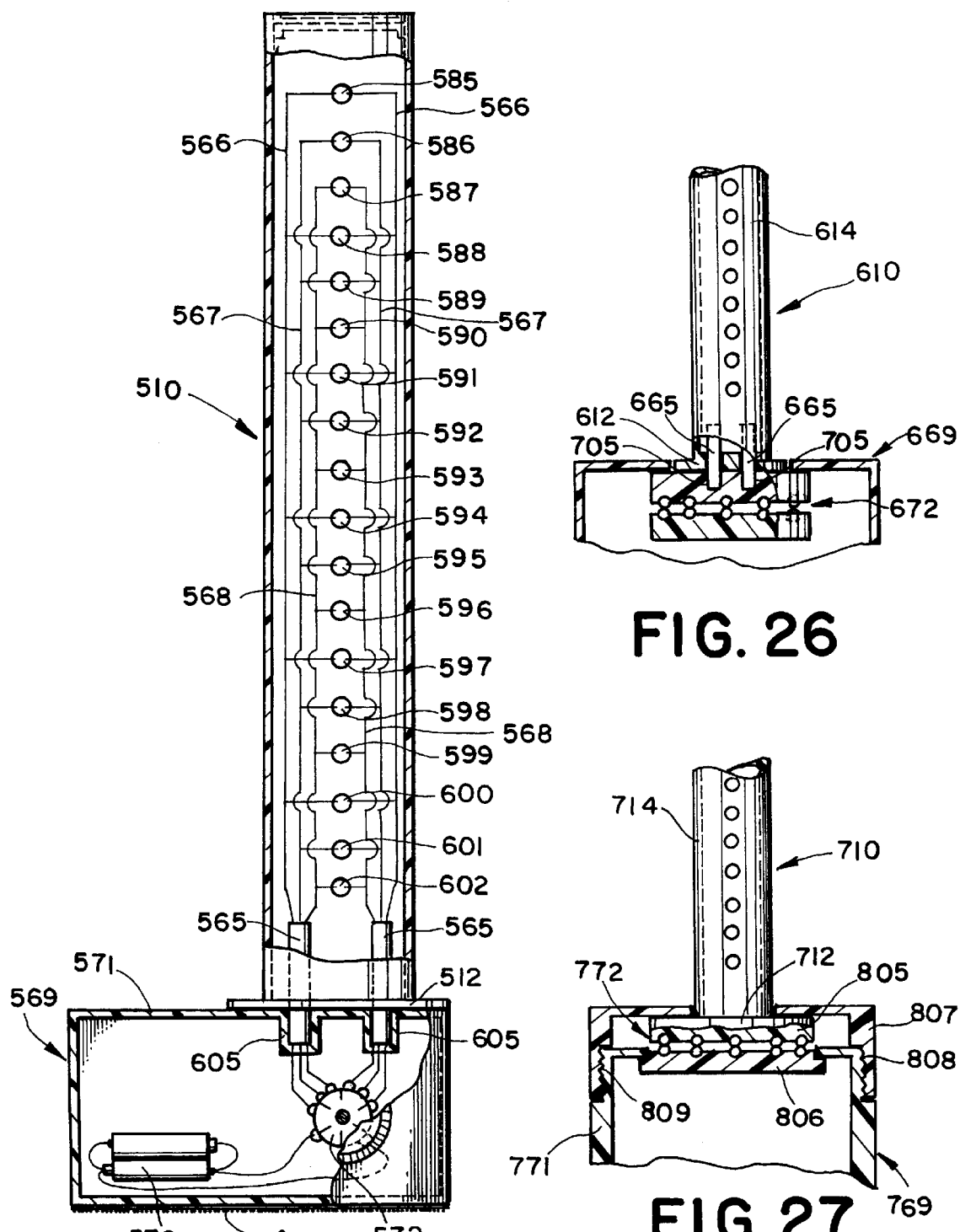

ILLUMINATED CAR LOCATOR

RELATED APPLICATION

This application is a continuation-in-part of U.S. application Ser. No. 08/360,267, filed on Dec. 21, 1994, now U.S. Pat. No. 5,921,109, which in turn is a continuation-in-part of U.S. application Ser. No. 08/303,457, filed on Sep. 9, 1994, which issued as U.S. Pat. No. 5,609,121 on Mar. 11, 1997, each application being incorporated herein by reference.

FIELD OF THE INVENTION

The present invention generally relates to a car locator and, more specifically, to a highly visible, illuminated car locator that mounts to and projects from a car in a conspicuous position to assist a user in locating his or her car in a parking area.

BACKGROUND OF THE INVENTION

Various types of markers have been used over the years to help people locate their vehicles in a variety of parking areas. Typically, a car marker, such as a ribbon or a ball, is attached to a radio antenna or in some other conspicuous location on a car to provide enhanced visibility of the car in parking areas.

One of the problems frequently encountered in utilizing conventional marking devices has been the difficulty of securing such devices to a car to prevent inadvertent detachment while at the same time enabling the devices to be conveniently reoriented or removed if necessary. In many instances, for example, tools may be required to affix or remove the devices. While not an overwhelming problem, the need for tools becomes most inconvenient if the marking device must be removed at remote locations. For example, the need for tools becomes a particular nuisance if the car marker must be temporarily removed at a location such as an automatic car wash.

In other instances, suction cup mounting has been employed to eliminate the need for tools. However, the use of suction cups is not always satisfactory because suction cups require a suitable mounting surface—one that is dry, clean and relatively flat, to permit secure attachment. The tendency of suction cups to prematurely release due to temperature or pressure changes is also a problem. As a result, the marking device might be damaged or lost in the event that a user neglects to remove the device prior to driving the car.

Other conventional devices suffer from the drawback that, once mounted, such devices cannot be easily repositioned into less conspicuous orientations. In accordance with the present invention, a car locator is provided that is capable of being moved into a highly visible orientation to facilitate in the location of a car, but is also capable of being conveniently repositioned or partially disassembled if the need arises.

Another major disadvantage of conventional car markers is that they are difficult to see in darkened parking areas. Although many are brightly colored, they are still hard to discern in poorly lit parking lots. In accordance with the present invention, an illuminated car locator is provided thereby facilitating car location at night or in dimly lit areas.

SUMMARY OF THE INVENTION

In accordance with the present invention, a car locator is provided. The car locator may be positioned to project above the top of a vehicle to enable visibility at a distance. The car locator includes a base for mounting the locator to the car. The base has a mounting section that generally conforms to the mounting surface of the car and is secured to the car using a mounting attachment such as a two-sided adhesive or a magnet attached to the base. In addition, the base includes a rod support in the form of two opposing support ribs projecting from the base to form an intermediate groove.

A cantilevered support rod having a mounting end and a free end is mounted on the base. The mounting end of the rod is pivotally connected to the rod support of the base on a pin that passes through a hole in the mounting end of the rod. The pin traverses the groove of the base and is supported at opposite ends by the opposing support ribs of the base. The pin allows pivotal movement of the rod relative to the base. An end portion of the mounting end of the rod is disposed in the groove between the support ribs and moves within the groove during pivotal movement of the rod. The free end of the rod projects from the base to provide a cantilevered support arm. The rod may be pivotally moved between selected positions relative to the base. The rod remains in position relative to the base after the rod is moved to selected positions.

In one embodiment, a highly visible fluorescent post in the form of a marking sleeve is mounted on the support rod to mark the car in a highly conspicuous manner. For this purpose, the sleeve includes bold markings, such as fluorescent colors, to enhance the visibility of the car locator. The sleeve has an opening at one end to permit slidable mounting of the sleeve onto the free end of the rod. The open end of the sleeve has a predetermined inside width that is generally the same as the outside width of the free end of the rod so that cooperating contact between the sleeve and the rod retains the sleeve in position on the rod. The sleeve sufficiently engages the free end of the rod to hold the sleeve in position on the rod.

In another embodiment of the invention, the visibility of the car locator is enhanced by illumination. In this embodiment, the locator comprises a bar or rod pivotally connected to a base. One or more conventional light bulbs or light emitting diodes (LEDs) are positioned along the length of the bar. The bulbs or LEDs are connected via electrical conductor wires to a power source. The LEDs may be connected directly to the conductor wires. Alternatively, the LEDs may be plug-in type LEDs which are connected to the conductors through a socket, thereby enabling the LEDs to be easily replaced. In a preferred embodiment, the power source is in the form of a battery housed within a base. Alternatively, the power source may be mounted directly to the base. In another embodiment, the power source, in the form of a battery or solar panel, is located within the car. In yet another embodiment, the power source is the car battery. A switch may be included for the purpose of turning the bulbs or LEDs on when the locator is in use and off when the locator is not being used. In one embodiment, the bulbs or LEDs produce colored light and are arranged to produce a recognizable pattern of colors. Further, the pattern of colors may be altered by the user by successive switch actuation. For example, an initial switch actuation may produce one color while another switch actuation produces another color. In yet another embodiment, the bulbs or LEDs are caused to flash or blink on and off in a predetermined pattern.

In yet another embodiment, LED light bars may plug in and out of a base unit containing or connectable with a power source. A switch may be provided to effect illumination or different patterns of illumination. In yet another embodiment, the light bar may plug into a switch and thereby serve as an external handle of the switch.

In still yet another embodiment, different LED light bars may plug into a base unit to effect illumination without the use of a switch. Different colored LED light bars may be utilized to effect different colors of illumination.

BRIEF DESCRIPTION OF THE DRAWINGS

The foregoing summary, as well as the following detailed description of the preferred embodiments of the present invention, will be better understood when read in conjunction with the appended drawings, in which:

FIG. 1 is a perspective view of the car locator mounted to a back window of a car in accordance with the present invention;

FIG. 2 is an exploded perspective view of the car locator shown in FIG. 1;

FIGS. 3 and 4 are side elevational views of the car locator shown in FIG. 1;

FIG. 5 is a front elevational view of the car locator shown in FIG. 1;

FIG. 6 is a back elevational view of the car locator shown in FIG. 1;

FIG. 7 is a top plan view of the car locator shown in FIG. 1;

FIG. 8 is a bottom plan view of the car locator shown in FIG. 1;

FIG. 9 is an enlarged front elevational view of a support rod for the car locator in accordance with the present invention;

FIG. 10 is an enlarged side elevational view of the support rod shown in FIG. 9;

FIG. 11 is an enlarged top plan view of a base for the car locator;

FIG. 12 is an enlarged front elevational view of a support rod for use with a car locator in accordance with another preferred embodiment of the invention;

FIG. 13 is an enlarged side elevational view of the support rod shown in FIG. 12;

FIG. 14 is an enlarged top plan view of an alternative base of a car locator for use in conjunction with the support rod shown in FIGS. 12 and 13;

FIG. 15 is a perspective view of another embodiment of the car locator mounted to the back window of a car in accordance with the present invention;

FIG. 16 is an enlarged side elevational view, partially cut away, of the car locator depicted in FIG. 15;

FIG. 17 is an enlarged, fragmentary side elevational view, partially cut away, of the free end of the car locator depicted in FIG. 15;

FIG. 18 is a cross-sectional view taken along line 4—4 of FIG. 17;

FIG. 19 is a schematic view of an alternate embodiment of a battery and switch used with the car locator shown in FIG. 15;

FIG. 20 is a schematic side elevational view of an adapter that can be plugged into a car cigarette lighter to provide power for illuminating the car locator shown in FIG. 15;

FIG. 21 is a schematic view of a solar powered energy source that can be used to illuminate the car locator shown in FIG. 15;

FIG. 22 is a schematic view of yet another embodiment of a battery and switch used with the car locator shown in FIG. 15;

FIG. 23 is an enlarged side elevational view, partially cut away, showing an alternate embodiment of the car locator in accordance with the present invention;

FIG. 24 is an enlarged side elevational view, partially cut away, showing yet another alternate embodiment of the car locator of the present invention;

FIG. 25 is an enlarged side elevational view, partially cut away, showing still another alternate embodiment of the car locator of the present invention;

FIG. 26 is a side elevational view, partially cut away, showing still another alternate embodiment of the car locator of the present invention;

FIG. 27 is a side elevational view, partially cut away, showing still another alternate embodiment of the car locator of the present invention.

DETAILED DESCRIPTION OF THE PREFERRED EMBODIMENT

Figure 28:
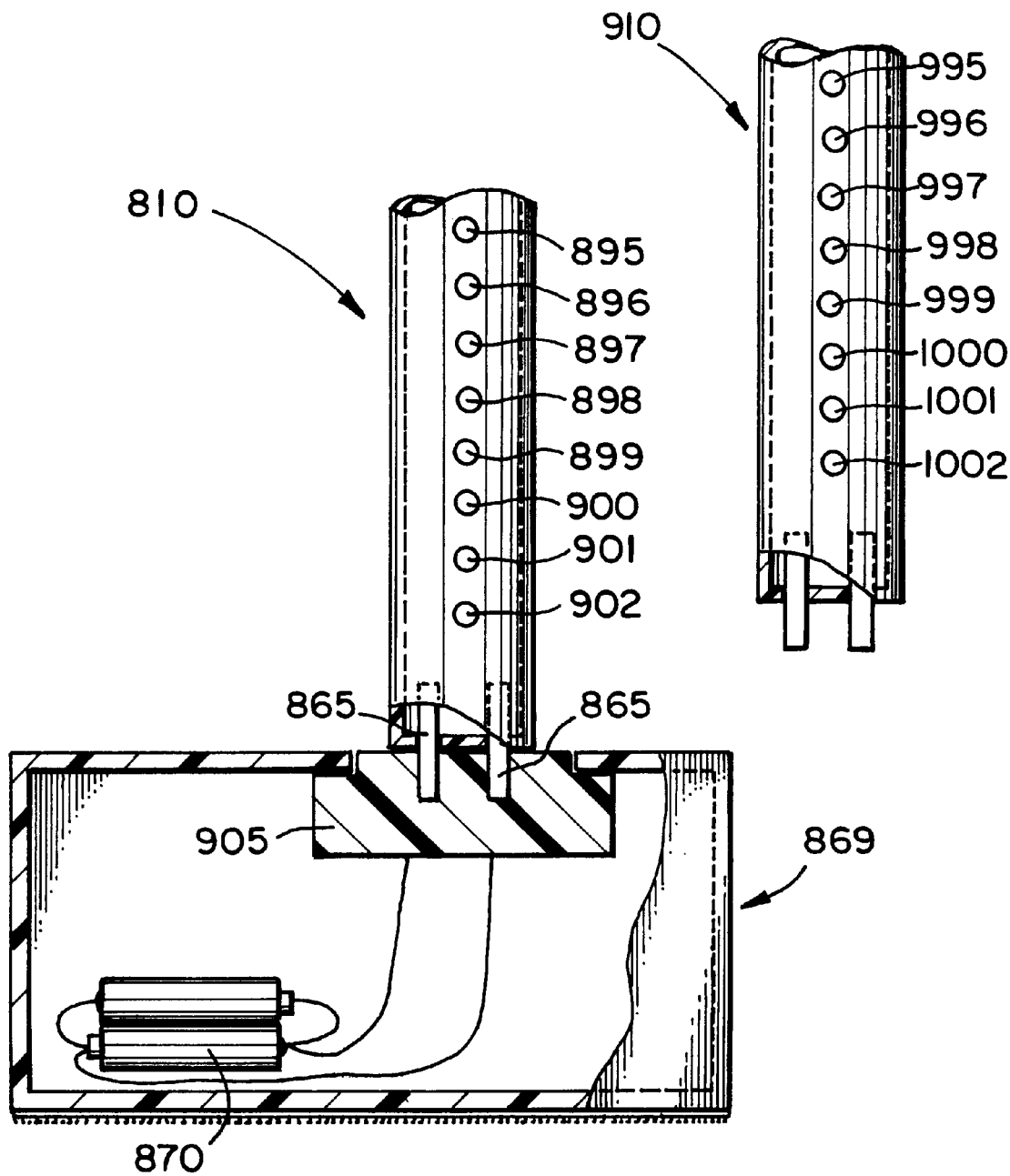
FIG. 28 is a side elevational view, partially cut away, showing still another alternate embodiment of the car locator of the present invention.

Referring to FIGS. 1 and 2, a highly-visible car locator, generally designated 10, serving as a vehicle locator device, is provided for placement on a vehicle for conspicuously marking the vehicle to assist in the location of the vehicle in a parking area. The car locator 10 may also be used to designate a status of a particular car. For example, an attendant at a rental car parking lot might use the car locator to designate those automobiles that are available for rental. In addition, different colors may be employed to delineate other types of vehicle status, such as long term or short term parking.

Generally, the car locator 10 includes a base 12 for attaching the car locator to the car. A cantilevered support rod 14 is pivotally connected with the base. The support rod 14 may be adjusted by manual displacement to project upwardly from the car to enable prominent marking of the car. Alternatively, the support rod 14 may be moved into a generally downward position extending generally along the surface of the car when marking of the car is not desired. To adjust the position of the support rod 14, the user simply pivots the support rod 14 relative to the base 12 stopping at a desired position. A highly-visible marking post in the form of a sleeve 16 having a fluorescent color may be mounted on the support rod 14 to enhance visibility of the marker. The sleeve 16 may be of various colors and configurations to differentiate vehicles when multiple users are utilizing the marking device.

The base 12 of the car locator is formed or molded from plastic and includes a mounting section 44 having a generally flat surface in order to conform to the generally flat surfaces of the cars on which the car locator 10 is to be mounted. For example, the generally flat surface of the mounting section 44 of the base 12 enables the car locator 10 to be securely mounted on a conforming flat surface of the rear window of a car as shown in FIG. 1. Alternatively, the mounting section 44 of the base 12 may be configured for mounting on irregular surfaces. For example, a slightly concave surface may be desirable when mounting the base 12 to a curved or convex section of the car.

A mounting attachment is provided on the base to permit the car locator to be securely attached to the car. For this purpose, a two-sided adhesive strip 40 may be attached to the mounting section 44 of the base for securing the base 12 of the car locator 10 to the car. Alternatively, a magnet attached to the base 12 may be used to facilitate removable mounting of the car locator 10 to the car.

The base 12 of the car locator 10 includes a rod support section having two spaced-apart support lugs in the form of opposing ramp-shaped ribs 26 projecting from the mounting section of the base to form a longitudinal groove 42 therebetween. The groove 42 provides a pathway extending across the top surface of the base 12.

A pivot pin 50 is held in position by the support ribs 26. The opposing ends of the pivot pin 50 are disposed in aligned holes 48 provided in the opposing support ribs 26 of the base 12 so that the pin 50 traverses the groove 42.

As shown in FIGS. 9 and 10, the support rod 14 may be in the form of a solid plastic cylindrical shaft 34 having a mounting end 24 for connection with the base 12 and a free end 36 for projection from the base to provide a pivotally movable, cantilevered support arm. The mounting end 24 of the support rod connects to the base 12 by pivot pin 50 which is inserted through an aperture 46 in the mounting end 24 of the support rod 14. The support rod 14 rotates about the pin 50.

The mounting end 24 of the cylindrical rod 34 is tapered into a generally flat end portion 28 that interfits within the groove 42 of the base 12 in friction fit between the support ribs 26. The support ribs 26 serve to guide the pivotal movement of the cantilevered support rod 14 by restricting lateral movement of the mounting end 24 of the support rod within the groove 42. The end portion 28 of the mounting end 24 of the rod is rounded to provide sufficient clearance between the end portion 28 of the rod and the base 12 on which the rod 34 is mounted to permit the rod 14 to freely pivot about pin 50 between selected raised and lowered positions. As the rod is pivoted, the rounded end portion 28 of the mounting end swings within the groove 42 between the support ribs 26 without contacting the base.

The pin 50 that connects the rod 14 to the base 12 is in the form of a screw 30 having a generally smooth central section on which the support rod is mounted and external threads on one end and a head on the other end. A corresponding hexagonal nut 38 is provided having internal threads for engaging the external threads of the screw 30. A counter-bore 54 is provided at the outside surface of one of the ribs 26 to countersink the head of the screw 30. A hexagonal recess 56 is provided at the outside surface of the other rib 26 to countersink the hexagonal nut 38. The hexagonal recess 56 prevents the recessed nut 38 from turning during rotation of the screw 50. Alternative pin arrangements, such as rivets, may also be used to connect the support rod 14 to the base 12.

The use of a screw 30 and nut 38 enables the friction fit between the ribs 26 and the interfitting flat end portion 28 of the rod 14 to be adjusted. When assembled, the threads on the screw mate with the threads on the nut. Consequently, when the screw is turned in one direction, the width of the groove 42 contracts and thereby increases the frictional contact force between the flat end portion 28 of the support rod 14 and the ribs 26 of the rod support. Alternatively, rotation of the screw in the opposite direction permits expansion of the groove 42 and thereby decreases the frictional contact force between the ribs 26 and the mounting end of the rod 14. Preferably, the friction fit between the support rod and the ribs of the base is adjusted to be loose enough so that the support rod 14 may be manually moved between desired positions but tight enough so that the support rod will be held in position after manual movement. A sufficient force should be provided to prevent the support rod from freely flopping back and forth.

An alternative rod configuration is shown in FIGS. 12 and 13. As illustrated, the support rod 114 is in the form of a bar 134 having a mounting end 124 and a free end 136. The mounting end 124 has square corners 150 and a through-hole 146. An alternative base 112, as shown in FIG. 14, is also provided. The base 112 includes a mounting section 144, a pair of ribs 126, and an intermediate groove 142 formed between the ribs 126. Through-holes 148 are provided in the ribs to support a screw 30 to permit mounting of the rod 114 to the base 112. In addition, a counter-bore 154 and a hexagonal recess 156 are provided in the ribs 126 to respectively countersink the head of the screw 30 and the nut 38. A clearance slot 152 is provided in the mounting section 144 of the base 112 in alignment with groove 142 to provide sufficient clearance between the square corners 150 of the rod 114 and the base 112 so that the square shoulders 150 pass within the slot 152 during pivotal movement of the rod 114. The clearance slot 152 provides swing room for the square corners of the support bar 134.

In operation, the base 12 and the support rod 14 may be used to mark the car as shown in FIG. 2. To enhance effectiveness as a car locator, the support rod 14 may be formed from a fluorescent-colored plexiglass material, which is highly visible from long distances. To further enhance the effectiveness of the car locator 10, a highly visible marking post in the form of a marking sleeve 16 is provided for attachment to the support rod 14. The marking sleeve 16 includes a generally hollow plastic outer tube 32 having open ends 22 and an inner cylindrical surface. The outer tube 32 may be made from a transparent plastic so that a colored or highly visible insert 20 disposed within the tube 32 is visible through the tube. The insert 20 may be formed as an inner liner for the tube by rolling a piece of fluorescent-colored paper into a tube with the fluorescent side of the paper facing outward. The rolled paper may then be inserted into the tube 32 through the open end 22. Once inserted, the rolled liner tends to unroll and thereby engages the inner cylindrical surface of the outer tube to hold the liner in position. Any colored or otherwise decorated insert may be used. The use of inserts permits convenient color selection or change. In other embodiments, a colored or decorated outer tube 32 may be used in addition to or instead of the insert. In addition, fluorescent paper may be crumpled and stuffed inside the tube 32.

A plastic end cap 18 is provided over the free end of the outer tube 32. The cap 18 is in friction fit with the tube 32 and functions to seal the free end of the tube 32. The other end of the tube remains open to permit slidable mounting of the tube onto the support rod.

Initially, a user of the car locator mounts the base 12 and rod 14 of the locator to a suitable surface of a car, such as a rear window. The car locator 10 can be used without the hollow sleeve 16, in which case the rod is pivotally adjusted to project upwardly away from the car to mark the car. For more visible marking, the hollow sleeve 16 is slipped onto the support rod 14. The sleeve 16 may either loose fit or slip fit over the free end of the support rod 14 or, alternatively, friction fit with the support rod. If the sleeve is dimensioned relative to the rod to engage the rod in loose fit or slip fit, the length of the rod must be sufficiently long relative to the length of the sleeve to retain the sleeve on the rod during use. The outside width of the free end of the rod must be about the same width as the inside width of the open end of the sleeve to provide a small amount of spacing therebetween to enable a slip fit. Alternatively, if the sleeve is dimensioned relative to the rod to engage the rod in friction fit, the outside width of the free end of the rod is dimensioned to be virtually the same as the inside width of the open end of the sleeve so that the contact force between the sleeve and the rod is sufficient to hold the sleeve on the rod. A loose fit or slip fit is desirable if the user of the car locator 10 wishes the sleeve 16 to be readily removable from the support rod simply by slipping or sliding the sleeve on and off the rod. In contrast, a friction fit may be desirable when the user of the car locator 10 desires the sleeve 16 to be retained more firmly on the support rod. Whether used in slip fit or friction fit, fasteners are not required to attach the sleeve to the rod. Consequently, tools are not required to install or remove the sleeve relative to the support rod.

The free end 36 of the rod 14 has an outside width, and optionally an outside shape, that is generally the same as the inside width, and optionally an inside shape, of the open end of the sleeve 16 so that cooperating contact between the sleeve 16 and the rod 14, whether in slip fit or friction fit, retains the sleeve 16 in position on the rod 14 without the use of fasteners or connectors. In the embodiment of the invention shown in FIGS. 12–14, the free end 136 of the support rod 114 has an outside width or dimension that is generally the same as the inside diameter or width of the open end of the sleeve 16 so that cooperating contact, between the sleeve 16 and the side edges of the rod 114, again whether in slip fit or friction fit, retains the sleeve 16 in position on the rod 114.

Another embodiment of the invention is depicted in FIGS. 15–18, wherein the car locator 210 is illuminated to enhance the visibility of the car locator 210 at night especially in poorly lit areas. Car locator 210 comprises a base 212 which is identical to the base 12 described in connection with car locator 10, for attaching the locator 210 to a car as shown in FIG. 15. Referring to FIG. 16, a flat bar or rod 214 is pivotally connected to the base 212. Toward that end, the bar 214 has a mounting end 224 which connects to the base 212 by pivot pin 250 in the same manner that support rod 14 connects with base 12.

The bar 214 contains a series of bore holes or apertures 260 positioned along the length of the bar 214. The bores 260 are sized and shaped to receive a series of miniature light bulbs or LEDs 262. As best seen in FIG. 18, one of the bulbs or LEDs 262 is positioned within each of the bores 260 of the bar 214. Alternatively, two LEDs may be positioned back-to-back within each bore 260 to provide increased lighting. Referring to FIG. 17, the light bulbs or LEDs 262 are connected via a pair of electrical conductors 264 to a pair of conductive strips 266. The two conductive strips 266 run in parallel near the outer edges of the bar 214 on opposite sides of the bores 260. The conductive strips 266 are in turn connected via electrical conductors 268 to a power source 269.

As shown in FIG. 16, the power source 269 comprises a battery or battery pack 270. Alternatively, the power source 269 may comprise the car battery which is accessed by connecting the car locator 210 to the car battery via the car's cigarette lighter with an adapter 274, as shown in FIG. 20. Alternatively, as shown in FIG. 21, the power source 269 may comprise a solar energy collector 276. In the embodiment depicted in FIG. 15, the conductors 268 leading to the power source 269 are snaked through the window seal such that the power source 269 can be located within the car.

As shown in FIG. 16, the car locator 210 also comprises an on/off toggle switch 272 for alternately switching the power to the bulbs or LEDs 262 on and off. The on/off switch may also be in the form of a push button 372, as shown in FIG. 19, or a remote sensor 472 for sensing a signal from a conventional remote control unit (not shown), as shown in FIG. 22.

A sleeve 216 is provided for attachment to the bar 214 to cover and protect the bar 214, bulbs or LEDs 262, electrical conductors 264, conductive strips 266, and electrical conductors 268. The sleeve 216 includes a generally hollow plastic outer tube 232 having at least one open end 222. The other end 233 of the tube 232 is closed by, for example, sealing the end 233 of the tube 232 or plugging the end 233 of the tube 232 with a cap. The outer tube 232 is positioned over the bar 214 by sliding the open end 222 of the tube 232 over the bar 214. The outer tube 232 is made from a transparent or semi-transparent material, such as a plastic, so that illumination from the bulbs or LEDs 262 is clearly visible through the tube 232.

An alternate embodiment of the locator depicted in FIG. 16 is shown in FIG. 23. The locator 310 is in most respects identical to locator 210 depicted in FIG. 16. The locator 310 comprises a series of LEDs, 385–402, which are similar to the LEDs 262 of locator 210. However, the LEDs, 385–402 are colored LEDs to enable the user to vary the pattern of lit LEDs thereby individualizing the pattern of lights and facilitating identification of the car. For example, LEDs 385–390 may be of a first color such as red, LEDs 391–396 of a second color such as yellow, and LEDs 397–402 of a third color such as blue. For this purpose, as shown in FIG. 23, each group of colored lights are connected to separate respective conductive strips 366, 367, or 368 so that each group of lights may be separately connected via a multi-wire conductor 369, i.e. a six wire conductor, with the power source when desired. Alternatively, the LEDs may be arranged in an alternating series of two or more colors. For example, LEDs 385, 388, 391, 394, 397, and 400 may be of a first color, LEDs 386, 389, 392, 395, 398, and 401 of a second color, and LEDs 387, 390, 393, 396, 399, and 402 of a third color. Accordingly, the user can decide to turn on all the LEDs or the LEDs of any one or two colors to mark the car. In yet a further embodiment, the bulbs or LEDs are attached to a conventional blinker circuit 500 for causing the bulbs or LEDs to blink or flash on and off in a desired pattern.

Yet another alternate embodiment of the car locator in accordance with the present invention is depicted in FIG. 24. The locator 410 is in almost all respects the same as locator 310. However, the power source 469, comprising battery or power pack 470, is contained within an enclosure 471. The enclosure 471 is attached to the mounting section 444 of base 412. Alternatively, the power pack may be contained within a base housing of the base 412. The switch 472 extends through a bore in the side of the enclosure 471 to allow the user to operate the switch 472 outside of the enclosure 471. A mounting attachment in the form of a two-sided adhesive strip 440 is attached to the bottom of the enclosure 471 for securing the locator 410 to the car. In this embodiment, the car locator can be activated externally of the car. This embodiment is particularly convenient for those users who do not wish to wire the car locator into the interior of the car.

Still another alternate embodiment of the locator according to the present invention is shown in FIG. 25. The locator 510 is in most respects identical to locator 310 depicted in FIG. 23. However, the LEDs, 585–602 are colored LEDs which are arranged to produce an alternating series of two or more colors. For example, LEDs 585, 588, 591, 594, 597, and 600 may be of a first color such as red, LEDs 586, 589, 592, 595, 598, and 601 of a second color such as yellow, and LEDs 587, 590, 593, 596, 599, and 602 of a third color such as blue. For this purpose, as shown in FIG. 25, each group of colored lights are connected to separate respective conductors 566, 567, or 568. Each of the conductors, 566, 567, and 568 are in turn connected to a multi-wire plug 565. As shown, the plug 565 forms part of the base 512 of the locator 510. The plug 565 mates with an outlet 605 of a power source 569, comprising a power pack 570 contained within an enclosure 571. Accordingly, the power source 569 can be mounted on the outside of the vehicle and the locator 510 plugged into the power source 569 when the locator 510 is to be used. Alternatively, when the power source 569 is to be mounted within the vehicle, the plug 565 may be attached to the conductors, 566, 567, and 568, by a suitable multi-lead cable which can then be snaked into the vehicle and plugged into the power source 569. A rotary switch 572 extends through a bore in the side of the power source 569 to allow the user to operate the switch 572 from outside of the power source 569. The switch 572 is a multi-position switch which enables the user to turn on all the LEDs, to turn on the LEDs of any one or two colors, or to turn off the locator 510. A mounting attachment in the form of a two-sided adhesive strip 540 is attached to the bottom of the power source 569 for securing the power source 569 to the vehicle. A tool, such as a pry bar (not shown), may be provided to facilitate removal of the locator 510 from the power source 569.

In the embodiment of FIG. 26, the locator 610 is identical to the locator 510 of FIG. 25. However, the locator 610 plugs directly into a rotary switch 672. Towards that end, the rotary switch 672 extends through a bore in the top of a power source 669. The switch 672 comprises an outlet 705 so that a plug 665 on the base 612 of the locator 610 plugs directly into the switch 672 through the outlet 705. Accordingly, the switch 672 can be operated, with the locator 610 plugged into the switch 672, by rotating rod 614 of locator 610.

In the embodiment of FIG. 27, the locator 710 is identical to the locator 610 of FIG. 26. However, the rotary switch 772 comprises a wiper 805, which forms a portion of the base 712 of the locator 710, and a contact plate 806, which extends through a bore of a cylindrical connector 807 having internal threads 808. The locator 710 is connected to the connector 807 so that the locator 710 can be freely rotated within the bore of the connector 807. The internal threads 808 of the connector 807 are sized to mate with external threads 809 provided along an exterior surface of enclosure 771 of power supply 769. Accordingly, with the locator 710 positioned within the bore of the connector 807, the connector 807 can be screwed onto the power source 769 so that the wiper 805 is operatively positioned adjacent the contact plate 806. The switch 772 can be then be moved between positions by rotating rod 714 of locator 710.

In the embodiment of FIG. 28, the locator 810 is identical to the locator 610 of FIG. 26 except that a plug 865 of the locator 810 plugs directly into an outlet 905 of a power source 869. Towards that end, the rotary switch 672 of the power source 669 is replaced by the outlet 905. Further, the power source 869 comprises a power pack 870, such as internal replaceable or rechargeable batteries, which is connected directly to the outlet 905. Accordingly, when the plug 865 of the locator 810 is plugged into the outlet 905, the power pack 870 provides power to the locator 810 thereby lighting a series of LEDs, 895–902. The embodiment of FIG. 28 is particularly suited for use with a series of locators optionally in the form of LED light bars, such as locators 810 and 910. The locators 810 and 910 are in all respects identical except that the LEDs 895–902 of locator 810 are of a different color from the LEDs 995–1002 of locator 910. Any different number of LED light bars can be utilized and may in fact be supplied as a package with the car locator to facilitate optional selection of different colored bars. Alternatively, the LEDs 895–902 may produce a colored pattern of light which differs from the colored pattern of light produced by LEDs 995–1002.

It will be recognized by those skilled in the art that changes or modifications may be made to the above-described embodiments without departing from the broad inventive concept of the invention. It should therefore be understood that this invention is not limited to the particular embodiments described herein but is intended to include all changes and modifications that are within the scope and spirit of the invention as set forth in the following claims.

What is claimed is:

1. A vehicle locator comprising:

(a) a base for holding the locator in selected position relative to the vehicle, the base having an enclosure and having a mounting section for engaging the vehicle to permit the locator to be positioned on the vehicle;

(b) a bar for attaching to the base, the bar having a mounting end with a plug wherein the plug is integrally provided on the mounting end of the bar;

(c) a light source positioned along the bar for illuminating the bar; and (d) a power source operatively connected to the light source, the power source located within the enclosure.

2. A vehicle locator comprising:

(a) a base for holding the locator in selected position relative to the vehicle, the base having a mounting section for engaging the vehicle to permit the locator to be positioned on the vehicle;

(b) a bar for attaching to the base, the bar having a mounting end with a plug wherein the plug is integrally provided on the mounting end of the bar;

(c) a light source positioned along the bar for illuminating the bar; and (d) a power source operatively connected to the light source, the power source located external to the vehicle.

3. A vehicle locator comprising:

(a) a base for holding the locator in selected position relative to the vehicle, the base having a mounting section for engaging the vehicle to permit the locator to be positioned on the vehicle;

(b) a bar for attaching to the base, the bar having a mounting end with a plug wherein the plug is integrally provided on the mounting end of the bar;

(c) a light source positioned along the bar for illuminating the bar; and (d) a power source operatively connected to the light source, the power source located within the base.

\* \* \* \* \*